United States Patent
Hu et al.

(10) Patent No.: US 10,686,696 B2
(45) Date of Patent: *Jun. 16, 2020

(54) PACKET SENDING METHOD, ROUTER, AND SERVICE SWITCHING ENTITY

(71) Applicant: HUAWEI TECHNOLOGIES CO., LTD., Shenzhen, Guangdong (CN)

(72) Inventors: Shihui Hu, Beijing (CN); Enhui Liu, Beijing (CN); Delei Yu, Beijing (CN); Chengyong Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/183,094

(22) Filed: Nov. 7, 2018

(65) Prior Publication Data

US 2019/0140942 A1 May 9, 2019

Related U.S. Application Data

(63) Continuation of application No. 15/006,409, filed on Jan. 26, 2016, now Pat. No. 10,148,562, which is a (Continued)

(30) Foreign Application Priority Data

Jul. 26, 2013 (CN) .......................... 2013 1 0320453

(51) Int. Cl.
*H04L 12/721* (2013.01)
*H04L 12/741* (2013.01)

(52) U.S. Cl.
CPC ............ *H04L 45/38* (2013.01); *H04L 45/745* (2013.01)

(58) Field of Classification Search
CPC .............................. H04L 45/38; H04L 45/745
See application file for complete search history.

(56) References Cited

U.S. PATENT DOCUMENTS

2003/0069973 A1   4/2003  Ganesan et al.
2005/0055573 A1*  3/2005  Smith ................. G06F 21/6218
                                                           726/4

(Continued)

FOREIGN PATENT DOCUMENTS

CN    101120552 A    2/2008
CN    101635680 A    1/2010

(Continued)

OTHER PUBLICATIONS

Notice of Allowance, dated Jul. 17, 2018, in U.S. Appl. No. 15/006,409 (8 pp.).

(Continued)

*Primary Examiner* — Ajay Cattungal
(74) *Attorney, Agent, or Firm* — Conley Rose, P.C.

(57) ABSTRACT

The application provide a packet sending method, a router, and a service switching entity. According to the application, a router determines a flow group identifier of a service packet and information about a next-hop service switching entity according to a user identifier and IP 5-tuple information; and forwards the packet to the next-hop service switching entity according to the information about the next-hop service switching entity, so that the next-hop service switching entity determines a corresponding destination service instance according to the user identifier, the flow group identifier, a router identifier, and a processing result, and forwards the packet to the destination service instance, to perform corresponding service processing, thereby implementing service packet forwarding among service instances. The router in the method provided in the embodiments has (Continued)

---

A router receives a service packet sent by a user, and acquires a user identifier and IP 5-tuple information according to the service packet — 101

The router determines, in a flow table entry, a flow group identifier and information about a next-hop service switching entity that are matched with the user identifier and the IP 5-tuple information, where the flow table entry includes multiple entries, and each entry includes a user identifier, IP 5-tuple information, a flow group identifier corresponding to the service packet, and information about a next-hop service switching entity — 102

After processing the service packet, the router sends a processed service packet to the next-hop service switching entity according to the information about the next-hop service switching entity, where the processed service packet includes the user identifier, the flow group identifier, a router identifier, and a processing result, so that the next-hop service switching entity forwards the processed service packet to a corresponding destination service instance — 103 a flow steering function, and steers a flow to a specified path to perform node-by-node processing.

20 Claims, 7 Drawing Sheets

Related U.S. Application Data continuation of application No. PCT/CN2014/083157, filed on Jul. 28, 2014.

(56) References Cited

U.S. PATENT DOCUMENTS

| | | | |
|---|---|---|---|
| 2006/0193248 A1 | 8/2006 | Filsfils et al. | |
| 2008/0291923 A1 | 11/2008 | Back et al. | |
| 2010/0050229 A1* | 2/2010 | Overby, Jr. | H04L 63/20 726/1 |
| 2010/0124225 A1* | 5/2010 | Fedyk | H04L 45/02 370/390 |
| 2011/0138394 A1 | 6/2011 | Ravishankar et al. | |
| 2013/0263214 A1* | 10/2013 | Yamagata | H04L 47/808 726/1 |
| 2014/0098674 A1* | 4/2014 | Sonoda | H04L 49/3009 370/238 |
| 2016/0006643 A1* | 1/2016 | Fukuda | H04L 45/42 370/237 |
| 2016/0142293 A1 | 5/2016 | Hu et al. | |
| 2016/0182510 A1* | 6/2016 | Sonoda | H04L 63/0876 726/4 |

FOREIGN PATENT DOCUMENTS

| | | |
|---|---|---|
| CN | 102025643 A | 4/2011 |
| CN | 102571602 A | 7/2012 |
| CN | 103581018 A | 2/2014 |
| WO | 2015010663 A1 | 1/2015 |

OTHER PUBLICATIONS

Office Action, dated Feb. 8, 2018, in U.S. Appl. No. 15/006,409 (18 pp.).
U.S. Appl. No. 15/006,409, filed Jan. 26, 2016, Shihui Hu et al., Huawei Technologies Co., Ltd.
Open Networking Foundation, "OpenFlow Switch Specication," Version 1.1.0 Implemented (Wire Protocol 0x02 ), Feb. 28, 2011 (58 pp.).
Office Action, dated Mar. 4, 2016, in Chinese Application No. 201310320453.8 (7 pp.).
Extended European Search Report, dated Oct. 14, 2016, in European Application No. 14829524.9 (9 pp.).
International Search Report, dated Dec. 17, 2014, in International Application No. PCT/CN2014/083157 (4 pp.).
Written Opinion of the International Searching Authority, dated Dec. 17, 2014, in International Application No. PCT/CN2014/083157 (10 pp.).

* cited by examiner

| User identifier | Flow group identifier | Identifier of a source service instance | Processing result |

PACKET SENDING METHOD, ROUTER, AND SERVICE SWITCHING ENTITY

CROSS-REFERENCE TO RELATED APPLICATIONS

This application is a continuation of U.S. patent application Ser. No. 15/006,409, filed on Jan. 26, 2016, which is a continuation of International Application No. PCT/CN2014/083157, filed on Jul. 28, 2014. The International Application claims priority to Chinese Patent Application No. 201310320453.8, filed on Jul. 26, 2013. All of the aforementioned patent applications are hereby incorporated by reference in their entireties.

TECHNICAL FIELD

Embodiments of the application relate to communications technologies, and in particular, to a packet sending method, a router, and a service switching entity.

BACKGROUND

With development of network technologies, there is a growing trend in the industry that an existing network function implemented by a dedicated network device is transferred to multiple general-purpose computer devices and implemented by software. Each computer device is configured to execute one type of service, or multiple service instances may be deployed on one computer, and each service instance is used to execute one type of service. Therefore, on the one hand, hardware costs may be reduced; on the other hand, network deployment flexibility may be enhanced, so that an operator more easily implements, based on an existing device, a service upgrade and performs secondary development of a network service.

In an existing packet forwarding method, after receiving a packet, a router searches a routing table according to a destination Internet Protocol (Internet Protocol, hereinafter referred to as IP) address of the packet, and obtains an IP address of a next-hop device; then, forwards the packet to the next-hop device. Therefore, service packet forwarding among multiple service instances cannot be implemented by using the existing packet forwarding method.

SUMMARY

Embodiments of the application provide a service packet sending method, a router, and a service switching entity, so as to implement service packet forwarding among multiple service instances.

A first aspect of the application provides a packet sending method, including:

receiving, by a router, a service packet sent by a user, and acquiring a user identifier and IP 5-tuple information according to the service packet;

determining, in a flow table entry by the router, a flow group identifier and information about a next-hop service switching entity that are matched with the user identifier and the IP 5-tuple information, where the flow table entry includes multiple entries, and each entry includes a user identifier, IP 5-tuple information, a flow group identifier, and information about a next-hop service switching entity; and sending, by the router after processing the service packet, a processed service packet to the next-hop service switching entity according to the information about the next-hop service switching entity, where the processed service packet includes the user identifier, the flow group identifier, a router identifier, and a processing result, so that the next-hop service switching entity forwards the processed service packet to a corresponding destination service instance.

In a first possible implementation manner of the first aspect of the application, before the determining, in a flow table entry by the router, a flow group identifier and information about a next-hop service switching entity that are matched with the user identifier and the IP 5-tuple information, the method further includes:

receiving, by the router, the flow table entry sent by a service controller.

With reference to the first aspect and the first possible implementation manner of the first aspect of the application, in a second possible implementation manner of the first aspect of the application, the determining, in a flow table entry by the router, a flow group identifier and information about a next-hop service switching entity that are matched with the user identifier and the IP 5-tuple information further includes:

if the flow group identifier and the information about the next-hop service switching entity that are matched with the user identifier and the IP 5-tuple information do not exist in the flow table entry, sending, by the router, the packet to the service controller, so that the service controller determines, according to a setting policy of the user, the flow group identifier and the information about the next-hop service switching entity that are matched with the user identifier and the IP 5-tuple information; and receiving, by the router, a destination entry sent by the service controller, where the destination entry includes the user identifier, the IP 5-tuple information, the flow group identifier, and the information about the next-hop service switching entity.

In a third possible implementation manner of the first aspect of the application, after the receiving, by the router, a destination entry sent by the service controller, the method further includes:

updating, by the router, the flow table entry according to the destination entry.

With reference to the first aspect and the first to the third possible implementation manners of the first aspect of the application, in a fourth possible implementation manner of the first aspect of the application, the information that is about the next-hop service switching entity and included in each entry of the flow table entry is an identifier of the next-hop service switching entity.

With reference to the first aspect and the first to the third possible implementation manners of the first aspect of the application, in a fifth possible implementation manner of the first aspect of the application, the information that is about the next-hop service switching entity and included in each entry of the flow table entry is a service label stack, and a stack top service label of the service label stack is an identifier of a next-hop service instance; and the sending, by the router after processing the service packet, a processed service packet to the next-hop service switching entity according to the information about the next-hop service switching entity includes:

pushing, by the router according to the service label stack matched with the user identifier and the IP 5-tuple information, a service label corresponding to the service label stack into the service label stack; adding, into the service packet, a service label stack into which the service label is pushed; and sending, by the router, the processed service packet to the next-hop service instance according to the stack top service label of the service label stack.

A second aspect of the application provides a packet sending method, including:

receiving, by a service switching entity, a service packet, where the service packet includes a user identifier, a flow group identifier, an identifier of a source service instance, and a processing result of the source service instance;

determining, in a routing table entry by the service switching entity, an identifier that is of a destination service instance and corresponding to the user identifier, the flow group identifier, the identifier of the source service instance, and the processing result, where the routing table entry includes multiple entries, and each entry includes a user identifier, a flow group identifier, an identifier of a source service instance, a processing result of the source service instance, and an identifier of a destination service instance; and sending, by the service switching entity according to the identifier of the destination service instance, the service packet to the destination service instance corresponding to the identifier of the destination service instance, to perform corresponding service processing.

In a first possible implementation manner of the second aspect of the application, the receiving, by a service switching entity, a service packet includes:

receiving, by the service switching entity, the service packet sent by a router, or receiving the service packet sent by a previous-hop service instance, or receiving the service packet sent by a service server corresponding to the previous-hop service instance.

In a second possible implementation manner of the second aspect of the application, if the service packet received by the service switching entity is sent by the router, the identifier of the source service instance is a router identifier, and the processing result is a result obtained after the router processes the packet; and the determining, in a routing table entry by the service switching entity, an identifier that is of a destination service instance and corresponding to the user identifier, the flow group identifier, the identifier of the source service instance, and the processing result includes:

determining, in the routing table entry by the service switching entity, the identifier that is of the destination service instance and corresponding to the user identifier, the flow group identifier, the router identifier, and the processing result.

In a third possible implementation manner of the second aspect of the application, if the identifier of the destination service instance is the router identifier, the sending, by the service switching entity according to the identifier of the destination service instance, the service packet to the destination service instance corresponding to the destination service instance, to perform corresponding service processing includes:

sending, by the service switching entity, the service packet to the router according to the router identifier, so that the router forwards the packet according to the user identifier and a destination IP address.

A third aspect of the application provides a packet sending method, including:

receiving, by a service switching entity, a service packet, where the service packet includes a service label stack, the service label stack includes multiple service labels, and each service label includes an identifier of a corresponding service instance; and sending, by the service switching entity according to a stack top service label of the service label stack, the service packet to a service instance corresponding to the stack top service label, to perform corresponding service processing.

In a first possible implementation manner of the third aspect of the application, the service packet further includes a user identifier, a flow group identifier corresponding to the packet, an identifier of a source service instance, and a processing result of the source service instance, so that a next-hop service instance processes the service packet according to the user identifier and the flow group identifier.

In a second possible implementation manner of the third aspect of the application, the receiving, by a service switching entity, a service packet includes:

receiving, by the service switching entity, the service packet sent by a router, or receiving, by the service switching entity, the service packet sent by the previous-hop service instance.

With reference to the first and the second possible implementation manners of the third aspect of the application, in a third possible implementation manner of the third aspect of the application, after the sending, by the service switching entity, the service packet to a service instance corresponding to the stack top service label, to perform corresponding service processing, the service switching entity determines, according to a processing result of the service instance, whether to perform forwarding according to the service label stack;

if yes, pops the stack top service label, and forwards, according to a new stack top service label, the packet to a service instance corresponding to the new stack top service label; and if no, determines a destination service label stack by querying a service label stack table according to the user identifier, the flow group identifier, the identifier of the source service instance, and the processing result of the source service instance; and forwards the packet according to the destination service label stack, where the source service instance refers to the service instance corresponding to the stack top service label, the service label stack table includes multiple entries, and each entry includes a user identifier, a flow group identifier, an identifier of a source service instance, a processing result of the source service instance, and a destination service label stack.

A fourth aspect of the application provides a router, including:

a receiving module, configured to receive a service packet sent by a user, and acquire a user identifier and IP 5-tuple information according to the service packet;

a determining module, configured to determine, in a flow table entry, a flow group identifier and information about a next-hop service switching entity that are matched with the user identifier and the IP 5-tuple information, where the flow table entry includes multiple entries, and each entry includes a user identifier, IP 5-tuple information, a flow group identifier, and information about a next-hop service switching entity;

a processing module, configured to process the service packet, where a processed service packet includes the user identifier, the flow group identifier, a router identifier, and a processing result; and a sending module, configured to send the processed service packet to the next-hop service switching entity according to the information about the next-hop service switching entity, so that the next-hop service switching entity forwards the processed service packet to a corresponding destination service instance.

In a first possible implementation manner of the fourth aspect of the application, the receiving module is further configured to receive the flow table entry sent by a service controller.

With reference to the fourth aspect and the first possible implementation manner of the fourth aspect of the application, in a second possible implementation manner of the fourth aspect of the application, the sending module is further configured to, if the flow group identifier and the information about the next-hop service switching entity that are matched with the user identifier and the IP 5-tuple information do not exist in the flow table entry, send the packet to the service controller, so that the service controller determines, according to a setting policy of the user, the flow group identifier and the information about the next-hop service switching entity that are matched with the user identifier and the IP 5-tuple information; and the receiving module is further configured to receive a destination entry sent by the service controller, where the destination entry includes the user identifier, the IP 5-tuple information, the flow group identifier, and the information about the next-hop service switching entity.

In a third possible implementation manner of the fourth aspect of the application, the router further includes:

an updating module, configured to update the flow table entry according to the destination entry after the receiving module receives the destination entry sent by the service controller.

With reference to the fourth aspect and the first to the third possible implementation manners of the fourth aspect of the application, in a fourth possible implementation manner of the fourth aspect of the application, the information that is about the next-hop service switching entity and included in each entry of the flow table entry is an identifier of the next-hop service switching entity.

With reference to the fourth aspect and the first to the third possible implementation manners of the fourth aspect of the application, in a fifth possible implementation manner of the fourth aspect of the application, the information that is about the next-hop service switching entity and included in each entry of the flow table entry is a service label stack, and a stack top service label of the service label stack is an identifier of a next-hop service instance;

the processing module is specifically configured to push, according to the service label stack matched with the user identifier and the IP 5-tuple information, a service label corresponding to the service label stack into the service label stack, and add, into the service packet, a service label stack into which the service label is pushed; and the sending module is specifically configured to send the processed service packet to the next-hop service instance according to the stack top service label of the service label stack.

A fifth aspect of the application provides a service switching entity, including:

a receiving module, configured to receive a service packet, where the service packet includes a user identifier, a flow group identifier, an identifier of a source service instance, and a processing result of the source service instance;

a determining module, configured to determine, in a routing table entry, an identifier that is of a destination service instance and corresponding to the user identifier, the flow group identifier, the identifier of the source service instance, and the processing result, where the routing table entry includes multiple entries, and each entry includes a user identifier, a flow group identifier, an identifier of a source service instance, a processing result of the source service instance, and an identifier of a destination service instance; and a sending module, configured to send, according to the identifier of the destination service instance, the service packet to the destination service instance corresponding to the identifier of the destination service instance, to perform corresponding service processing.

In a first possible implementation manner of the fifth aspect of the application, the receiving module is specifically configured to receive the service packet sent by a router, or receive the service packet sent by a previous-hop service instance, or receive the service packet sent by a service server corresponding to the previous-hop service instance.

In a second possible implementation manner of the fifth aspect of the application, if the service packet received by the receiving module is sent by the router, the identifier of the source service instance is a router identifier, and the processing result is a result obtained after the router processes the packet; and the determining module is specifically configured to determine, in the routing table entry, the identifier that is of the destination service instance and corresponding to the user identifier, the flow group identifier, the router identifier, and the processing result.

In a third possible implementation manner of the fifth aspect of the application, if the identifier of the destination service instance is the router identifier, the sending module is specifically configured to send the service packet to the router according to the router identifier, so that the router forwards the packet according to the user identifier and a destination IP address.

A sixth aspect of the application provides a service switching entity, including:

a receiving module, configured to receive a service packet, where the service packet includes a service label stack, the service label stack includes multiple service labels, and each service label includes an identifier of a corresponding service instance; and a sending module, configured to send, according to a stack top service label of the service label stack, the service packet to a service instance corresponding to the stack top service label, to perform corresponding service processing.

In a first possible implementation manner of the sixth aspect of the application, the service packet further includes a user identifier, a flow group identifier corresponding to the packet, an identifier of a source service instance, and a processing result obtained after a service instance corresponding to the source service instance processes the packet, so that a next-hop service instance processes the service packet according to the user identifier, the flow group identifier, the identifier of the source service instance, and the processing result.

In a second possible implementation manner of the sixth aspect of the application, the receiving module is specifically configured to receive the service packet sent by a router, or receive the service packet sent by a service switching entity corresponding to the previous-hop service instance.

With reference to the first and the second possible implementation manners of the sixth aspect of the application, in a third possible implementation manner of the sixth aspect of the application, the service switching entity further includes:

a determining module, configured to determine, according to the processing result of the service instance, whether to perform forwarding according to the service label stack;

if yes, the sending module is specifically configured to pop the stack top service label, and forward, according to a new stack top service label, the packet to a service instance corresponding to the new stack top service label; and if no, the sending module determines a destination service label stack by querying a service label stack table according to the user identifier, the flow group identifier, the identifier of the source service instance, and the processing result of the source service instance; and forwards the packet according to the destination service label stack, where the source service instance refers to the service instance corresponding to the stack top service label, the service label stack table includes multiple entries, and each entry includes a user identifier, a flow group identifier, an identifier of a source service instance, a processing result of the source service instance, and a destination service label stack.

According to the packet sending method provided in the embodiments of the application, a router determines a flow group identifier of a service packet and information about a next-hop service switching entity according to a user identifier and IP 5-tuple information; and forwards the packet to the next-hop service switching entity according to the information about the next-hop service switching entity, so that the next-hop service switching entity determines a corresponding destination service instance according to the user identifier, the flow group identifier, a router identifier, and a processing result, and forwards the packet to the destination service instance, to perform corresponding service processing, thereby implementing service packet forwarding among service instances. The router in the method provided in the embodiments has a flow steering function, and steers a flow to a specified path for node-by-node processing.

BRIEF DESCRIPTION OF DRAWINGS

To describe the technical solutions in the embodiments of the application more clearly, the following briefly introduces the accompanying drawings required for describing the embodiments. Apparently, the accompanying drawings in the following description show some embodiments of the application, and a person of ordinary skill in the art may still derive other drawings from these accompanying drawings without creative efforts.

DESCRIPTION OF EMBODIMENTS

Figure 1:
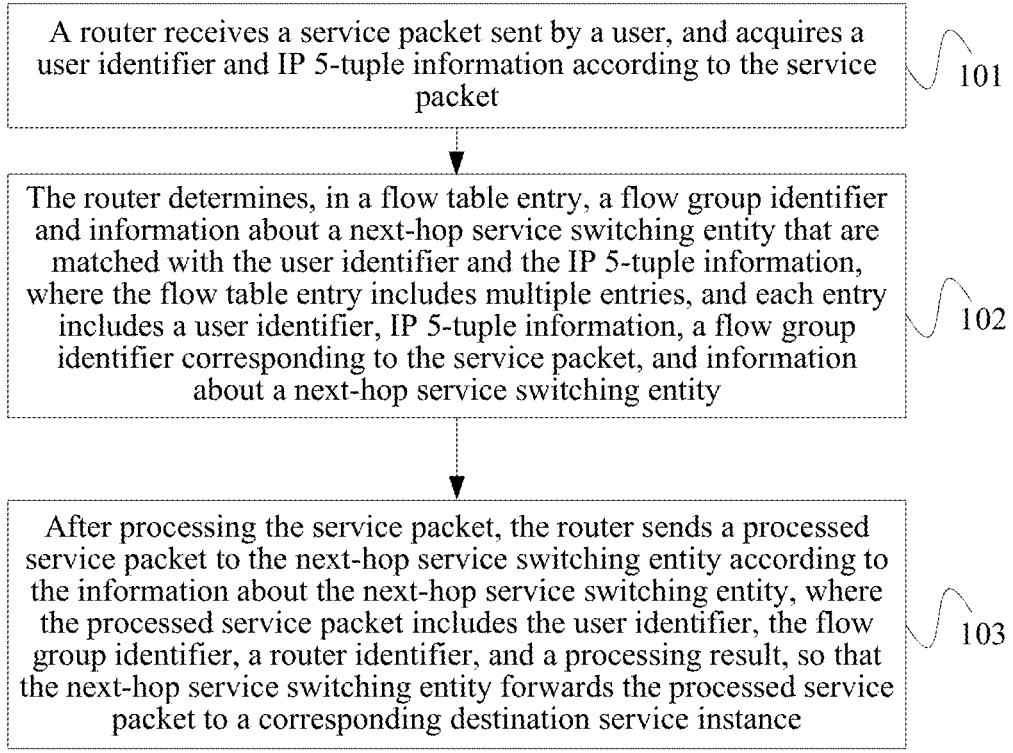
FIG. 1 is a flowchart of Embodiment 1 of a packet sending method according to the application.

To make the objectives, technical solutions, and advantages of the embodiments of the application clearer, the following clearly describes the technical solutions in the embodiments of the application with reference to the accompanying drawings in the embodiments of the application. Apparently, the described embodiments are some but not all of the embodiments of the application. All other embodiments obtained by a person of ordinary skill in the art based on the embodiments of the application without creative efforts shall fall within the protection scope of the application.

Network architectures applicable to the application mainly include a router, a service controller, and multiple service servers. The router includes a flow table entry, and the flow table entry is delivered by the service controller; the router acquires a user identifier and IP 5-tuple information according to a received service packet, determines a flow according to the user identifier and the IP 5-tuple information, and then forwards the packet to a corresponding service server according to the flow table entry. For an unidentified flow, the router sends the flow to the service controller for decision making by the service controller.

After the service controller receives the unidentified flow sent by the router, the service controller makes a decision and delivers a flow table entry to the router. The flow table entry delivered by the service controller to the service router is based on the flow, where an address of a next-hop service server of each flow is specified. At the same time, the service controller delivers a service routing table entry to a service server. A concept of flow group is introduced herein, and a flow group is determined by fuzzy matching of a user identifier, an IP 5-tuple, and a type of a flow, where a matching element herein may be a wildcard character. The service controller formulates one set of service routing table entries for each flow group, and the service server implements packet forwarding and processing according to a routing table entry.

The network architectures in the embodiments may further include a switch, where the switch may be a virtual switch deployed on a service server, or may be an independent service switch; the two are collectively referred to as a service switching entity in the following embodiments. The service switching entity includes a service routing table entry; after receiving a packet from a router or a previous-hop service server, the service switching entity finds a corresponding destination service instance according to a user identifier, a flow group identifier, an identifier of a source service instance, and a processing result that are in the packet, and forwards the packet to the corresponding destination service instance, where the service instance is deployed on the service server; multiple service instances may be deployed on one service server; each service instance is used to perform one type of service processing.

FIG. 1 is a flowchart of Embodiment 1 of a packet transferring method according to the application. As shown in FIG. 1, the method in this embodiment includes the following:

101: A router receives a service packet sent by a user, and acquires a user identifier and IP 5-tuple information according to the service packet.

That a router acquires a user identifier and IP 5-tuple information according to the service packet is specifically that: the router determines, according to an inbound interface of the service packet, which user sends the packet, where each user is corresponding to one inbound interface, and the user identifier is determined according to the inbound interface. The IP 5-tuple information includes a source IP address, a destination IP address, a source port, a destination port, and a protocol type; the IP 5-tuple information is carried in the service packet, and the router acquires the IP 5-tuple information by parsing the service packet.

102: The router determines, in a flow table entry, a flow group identifier and information about a next-hop service switching entity that are matched with the user identifier and the IP 5-tuple information, where the flow table entry includes multiple entries, and each entry includes a user identifier, IP 5-tuple information, a flow group identifier, and information about a next-hop service switching entity.

After determining the user identifier and the IP 5-tuple information of the service packet, the router queries a stored flow table entry, where the flow table entry includes multiple entries, and each entry includes a user identifier, IP 5-tuple information, a flow group identifier, and information about a next-hop service switching entity. A concept of flow group is introduced herein, and a flow group is determined by fuzzy matching of a user identifier, an IP 5-tuple, and a type of a flow, where a matching element herein may be a wildcard character. For example, service packets of which user identifiers are 1, and source IP addresses are 196.124.1.* are grouped into a same flow group; flow group identifiers of service packets in a same flow group are the same; a controller formulates one set of service routing table entry for each flow group.

In this embodiment, the router queries the stored flow table entry according to the user identifier and the IP 5-tuple information, and determines the flow group identifier and the information about the next-hop service switching entity that are matched with the packet.

103: After processing the service packet, the router sends a processed service packet to the next-hop service switching entity according to the information about the next-hop service switching entity, where the processed service packet includes the user identifier, the flow group identifier, a router identifier, and a processing result, so that the next-hop service switching entity forwards the processed service packet to a corresponding destination service instance.

In this step, that the router processes the service packet is specifically that: the router encapsulates the user identifier, the flow group identifier, the router identifier, and the processing result into the packet according to the determined flow group identifier. Generally, a router only performs forwarding processing on a packet, and does not perform actual service processing; therefore, the processing result herein may be 0. In this embodiment, the processed service packet carries the user identifier, the flow group identifier, the router identifier, and the processing result, so that the next-hop service switching entity determines the corresponding destination service instance according to the user identifier, the flow group identifier, the router identifier, and the processing result, and forwards the packet to the service instance, to perform corresponding service processing. After performing service processing on the packet, the destination service instance encapsulates the packet and sends an encapsulated packet to the service switching entity.

Specifically, the destination service instance encapsulates the user identifier, the flow group identifier, an identifier of a source service instance, and a processing result into the packet, and forwards the encapsulated packet to the service switching entity, where the identifier of the source service instance is an identifier of the destination service instance, and the processing result is a result obtained after the destination service instance processes the packet. The service switching entity acquires information about a next-hop service instance by querying the flow table entry according to the user identifier, the flow group identifier, the identifier of the source service instance, and the processing result that are in the service packet, and forwards the packet to the next-hop service instance, thereby implementing packet forwarding among service instances.

According to the packet sending method provided in this embodiment, a router determines a flow group identifier of a service packet and information about a next-hop service switching entity according to a user identifier and IP 5-tuple information; and forwards the packet to the next-hop service switching entity according to the information about the next-hop service switching entity, so that the next-hop service switching entity determines a corresponding destination service instance according to the user identifier, the flow group identifier, a router identifier, and a processing result, and forwards the packet to the destination service instance, to perform corresponding service processing, thereby implementing service packet forwarding among service instances. The router in the method provided in this embodiment has a flow steering function, and steers a flow to a specified path for node-by-node processing.

It should be noted that Embodiment 1 is mainly applicable to a process of processing a subsequent packet. Firstly, a first-packet and a subsequent packet are introduced briefly: The first-packet refers to one or more service packets of a flow before being identified, that is, a flow having no corresponding flow matching rule in a router; correspondingly, the subsequent packet refers to a packet that enters the router after the matching rule of the flow is loaded into the router. A prerequisite for processing the subsequent packet is that a corresponding flow table entry is saved in the router. Therefore, before 102, that is, before the router determines, in the flow table entry, the flow group identifier and the information about the next-hop service switching entity that are matched with the user identifier and the IP 5-tuple information, the router receives the flow table entry sent by a service controller. After the subsequent packet of the flow reaches the router, the router determines, according to the user identifier and the IP 5-tuple information, the flow group identifier and the information about the next-hop service switching entity that are matched with the packet, and encapsulates and forwards the packet according to the method in Embodiment 1.

Figure 2:
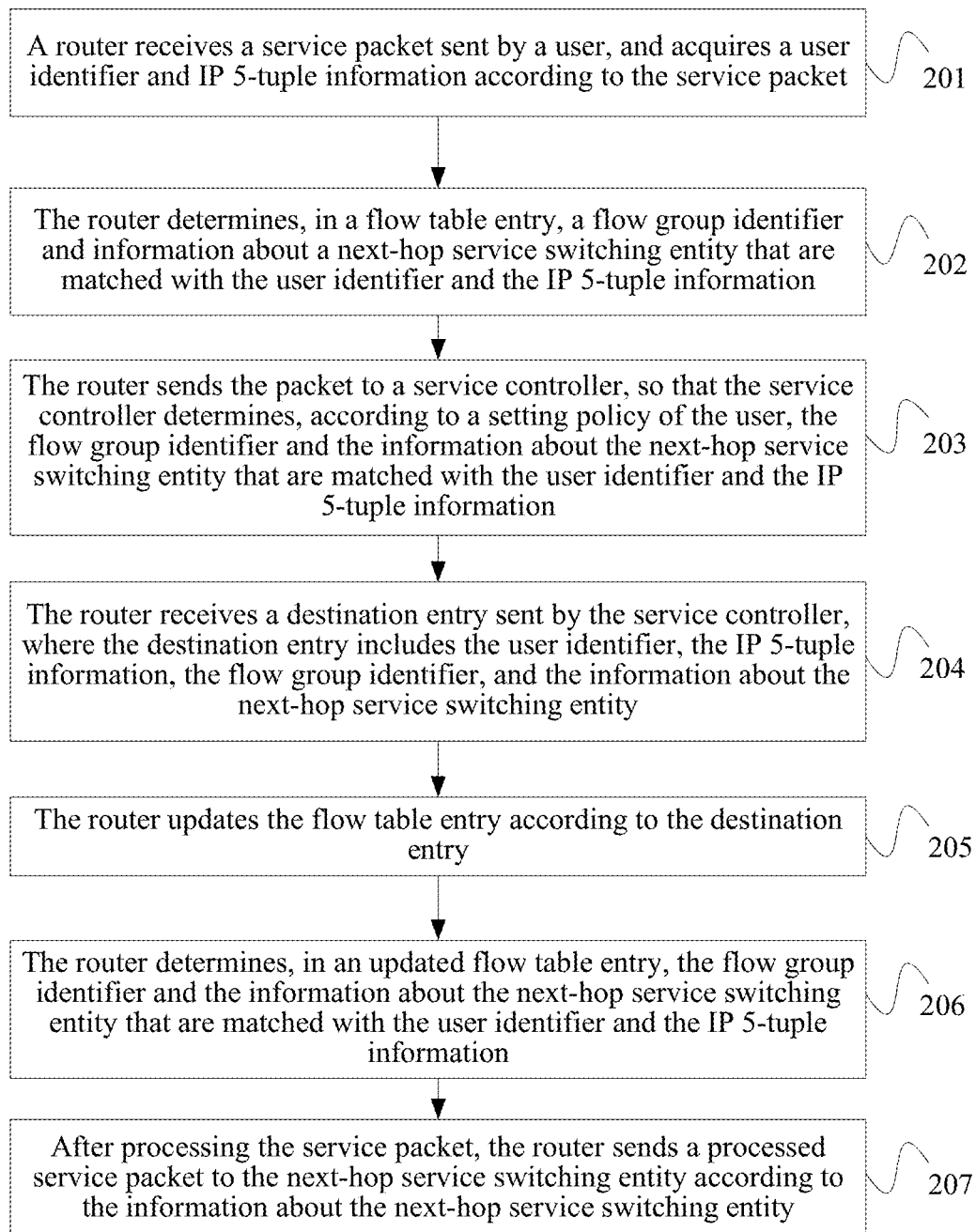
FIG. 2 is a flowchart of Embodiment 2 of a packet sending method according to the application.

For the first-packet of the flow, after receiving the packet, the router determines, according to the user identifier and the IP 5-tuple information, that the flow has no matched flow group identifier and information about a next-hop service switching entity; then, the router sends the flow to the service controller. The service controller performs identification on the flow to identify a type of the flow, and determines a flow group identifier and a service routing table entry that are corresponding to the flow. The service controller delivers the flow table entry to the router, so that the router forwards the packet to the next-hop service switching entity according to the flow table entry, where the flow table entry includes the user identifier, the IP 5-tuple information, the flow group identifier, and the information about the next-hop service switching entity; and delivers the routing table entry to the service switching entity, where the routing table entry includes multiple entries, and each entry includes a user identifier, a flow group identifier, an identifier of a source service instance, a processing result, and an identifier of a destination service instance, so that the service switching entity forwards the packet to the destination service instance according to the routing table entry. The following describes a complete process of processing a flow in detail by using Embodiment 2. FIG. 2 is a flowchart of Embodiment 2 of a packet sending method according to the application. As shown in FIG. 2, the method provided in this embodiment includes the following:

201: A router receives a service packet sent by a user, and acquires a user identifier and IP 5-tuple information according to the service packet.

In this step, the service packet is a first-packet of a flow. For how to acquire the user identifier and the IP 5-tuple information, reference may be made to the description of Embodiment 1, and details are not described herein again.

202: The router determines, in a flow table entry, a flow group identifier and information about a next-hop service switching entity that are matched with the user identifier and the IP 5-tuple information.

The flow table entry includes multiple entries, and each entry includes a user identifier, IP 5-tuple information, a flow group identifier, and information about a next-hop service switching entity. The router may query, in the flow table entry, the matched flow group identifier and information about the next-hop service switching entity according to the acquired user identifier and IP 5-tuple information.

In this embodiment, because the received packet is the first-packet of the flow, the flow table entry does not have the flow group identifier and the information about the next-hop service switching entity that are matched with the user identifier and the IP 5-tuple information. If the flow group identifier and the information about the next-hop service switching entity that are matched with the user identifier and the IP 5-tuple information do not exist in the flow table entry, the router sends the packet to a service controller, so that the service controller determines, according to a setting policy of the user, the flow group identifier and the information about the next-hop service switching entity that are matched with the user identifier and the IP 5-tuple information.

203: The router sends the packet to a service controller, so that the service controller determines, according to a setting policy of the user, the flow group identifier and the information about the next-hop service switching entity that are matched with the user identifier and the IP 5-tuple information.

After receiving the packet sent by the router, the service controller performs identification on the flow according to a service customized by the user, so as to identify a type of the flow; determines a flow group identifier corresponding to the flow, and a destination entry corresponding to a flow group; and delivers the determined destination entry to the router.

204: The router receives a destination entry sent by the service controller, where the destination entry includes the user identifier, the IP 5-tuple information, the flow group identifier, and the information about the next-hop service switching entity.

205: The router updates the flow table entry according to the destination entry.

After receiving the destination entry delivered by the controller, the router saves the destination entry in the flow table entry and updates the flow table entry. When a subsequent packet of the flow arrives, the flow group identifier and the information about the next-hop service switching entity that are matched with the user identifier and the IP 5-tuple information can be found according to the flow table entry.

206: The router determines, in an updated flow table entry, the flow group identifier and the information about the next-hop service switching entity that are matched with the user identifier and the IP 5-tuple information.

For a specific implementation manner, reference may be made to the description of 102 in Embodiment 1.

207: After processing the service packet, the router sends a processed service packet to the next-hop service switching entity according to the information about the next-hop service switching entity.

The processed service packet includes the user identifier, the flow group identifier, a router identifier, and a processing result, so that the next-hop service switching entity forwards the processed service packet to a corresponding destination service instance. That the router processes the service packet is specifically that: the router encapsulates the user identifier, the flow group identifier, the router identifier, and the processing result into the packet according to the determined flow group identifier. Generally, a router only performs forwarding processing on a packet, and does not perform actual service processing; therefore, the processing result herein is 0.

In this embodiment, the information that is about the next-hop service switching entity and included in each entry of the flow table entry may be an identifier of the next-hop service switching entity, or may be a service label stack, where a stack top service label of the service label stack is an identifier of a next-hop service instance.

The identifier of the next-hop service switching entity may be a MAC address of the next-hop service switching entity; then, after processing the packet, the router forwards the processed packet to the next-hop service switching entity according to the MAC address of the next-hop service switching entity. Certainly, the identifier of the next-hop service switching entity may also be another identifier as long as the identifier can uniquely identify the service switching entity; the router determines address information of the switching entity according to the identifier of the service switching entity, and forwards the packet to the service switching entity according to the address information of the switching entity.

If the information about the next-hop service switching entity is the service label stack, and the stack top service label of the service label stack is the identifier of the next-hop service instance, that after processing the service packet, the router sends a processed service packet to the next-hop service switching entity according to the information about the next-hop service switching entity is specifically that: the router pushes, according to the service label stack matched with the user identifier and the IP 5-tuple information, a service label corresponding to the service label stack into the service label stack, and adds, into the service packet, a service label stack into which the service label is pushed; the router sends the processed service packet to the next-hop service instance according to the stack top service label of the service label stack. Herein, the service switching entity is a service server, and a service instance is deployed on the service server. Therefore, firstly, the router forwards, according to the stack top service label, the packet to a service server corresponding to the next-hop service instance; then, the service server forwards the packet to the next hop service instance.

According to the method provided in this embodiment, after receiving a packet, a router determines, in a flow table entry, a matched flow group identifier and matched information about a next-hop service switching entity according to a user identifier and IP 5-tuple information, and steers a flow to a determined service path for node-by-node processing.

Figure 3:
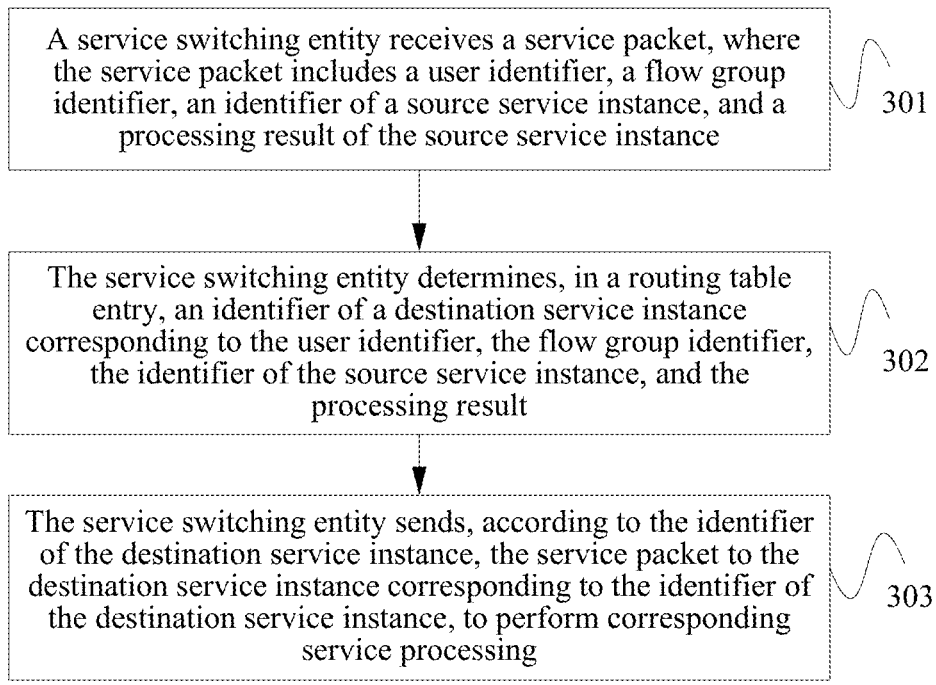
FIG. 3 is a flowchart of Embodiment 3 of a packet sending method according to the application.

FIG. 3 is a flowchart of Embodiment 3 of a packet sending method according to the application. In the foregoing Embodiment 1 and Embodiment 2, a router steers a service flow to a service switching entity by querying a flow table entry; the following describes in detail how a service switching entity implements service packet forwarding among service instances. In this embodiment, after receiving a service packet, a service switching entity forwards, in a manner of querying a routing table entry, the service packet to a corresponding service instance, to perform service processing. As shown in FIG. 3, the method provided in this embodiment includes the following:

301: A service switching entity receives a service packet, where the service packet includes a user identifier, a flow group identifier, an identifier of a source service instance, and a processing result of the source service instance.

In this embodiment, the service switching entity may be a service server in which a service instance is located, or may be a virtual switch on a service server, or may be a service switch that is connected to multiple service servers. That a service switching entity receives a service packet is specifically that: the service switching entity receives the service packet sent by a router, or receives the service packet sent by a previous-hop service instance, or receives the service packet sent by a service server corresponding to the previous-hop service instance.

In this embodiment, an identifier of a service instance is used to uniquely identify a service instance; during service deployment, a globally unique identifier in a service platform is allocated to each service instance.

When the service switching entity is a service server, the service server receives a service packet sent by a previous-hop service server, or a service packet sent by a service switch that is connected to multiple service servers. When the service switching entity is a virtual switch on a service server, the received service packet is a service packet sent by a service instance deployed on the service server. One virtual switch and multiple service instances may be deployed on the service server; after processing the packet, each service instance re-encapsulates the packet, and the virtual switch forwards a re-encapsulated packet to a next-hop service instance. If the service server is a first-hop service server, the service packet received by the service server is a packet forwarded by the router; if the service packet received by the service switching entity is sent by a router, the identifier of the source service instance is a router identifier, and the processing result is a result obtained after the router processes the packet. Therefore, the router may be considered as a special service instance.

If the service switching entity is a service switch, and the service switch is connected to a router and multiple service servers separately, the service packet received by the service switch may be forwarded by the router or may be forwarded by a service server. If the packet received by the service switch is forwarded by the router, the identifier of the source service instance is a router identifier, and the processing result is a result obtained after the router processes the packet. If the service packet received by the service switch is forwarded by the service server, the identifier of the source service instance is an identifier of a service instance on the service server, and the processing result is a result obtained after the service instance on the service server processes the packet. In this scenario, after each service instance processes the packet according to the user identifier and the flow group identifier, a service server to which the service instance belongs encapsulates the packet, where an encapsulated packet includes the user identifier, the flow group identifier, the identifier of the source service instance, and the processing result; the service server forwards the packet to the service switch; the service switch forwards the service packet.

302: The service switching entity determines, in a routing table entry, an identifier that is of a destination service instance and corresponding to the user identifier, the flow group identifier, the identifier of the source service instance, and the processing result.

The routing table entry includes multiple entries, and each entry includes a user identifier, a flow group identifier, an identifier of a source service instance, a processing result of the source service instance, and an identifier of a destination service instance. The routing table entry is a routing table entry required by a service controller for determining, when a user gets online, both a service instance required by the user and all types of service flows of the user according to a service customized by the user. The routing table entry of the user is delivered to the service switching entity. When the service switching entity is a virtual switch, the service controller delivers the routing table entry to each virtual switch; when the service switching entity is a service server, the service controller delivers the routing table entry to the service server; when the service switching entity is a service switch, the service controller delivers the routing table entry only to the service switch.

The service switching entity queries the routing table entry according to the user identifier, the flow group identifier, the identifier of the source service instance, and the processing result to acquire the identifier of the destination service instance, that is, an identifier of a next-hop service instance. Herein, the identifier of the source service instance may be the router identifier, and correspondingly, the processing result is a result obtained after the router processes the packet. Then, the service switching entity determines, in the routing table entry, the identifier that is of the destination service instance and corresponding to the user identifier, the flow group identifier, the router identifier, and the processing result. Therefore, the router may also be used as a service instance in an actual processing process.

303: The service switching entity sends, according to the identifier of the destination service instance, the service packet to the destination service instance corresponding to the identifier of the destination service instance, to perform corresponding service processing.

After determining the identifier of the destination service instance of the packet, the service switching entity sends the packet to the corresponding service instance according to the identifier of the service instance. If the identifier of the destination service instance is the router identifier, the service switching entity sends the service packet to the router according to the router identifier, so that the router forwards the packet according to the user identifier and a destination IP address.

According to the method provided in this embodiment, after receiving a service packet, a service switching entity determines, in a pre-stored routing table entry according to a user identifier, a flow group identifier, an identifier of a source service instance, and a processing result that are included in the service packet, an identifier that is of a destination service instance and corresponding to the user identifier, the flow group identifier, the identifier of the source service instance, and the processing result; and sends, according to the identifier of the destination service instance, the service packet to the destination service instance, to perform processing. In the method provided in this embodiment, after a type of a flow is determined, routing is performed in a manner of querying the routing table entry according to the type of the flow, thereby implementing service packet forwarding among service instances, and flexible service packet processing.

Figure 4:
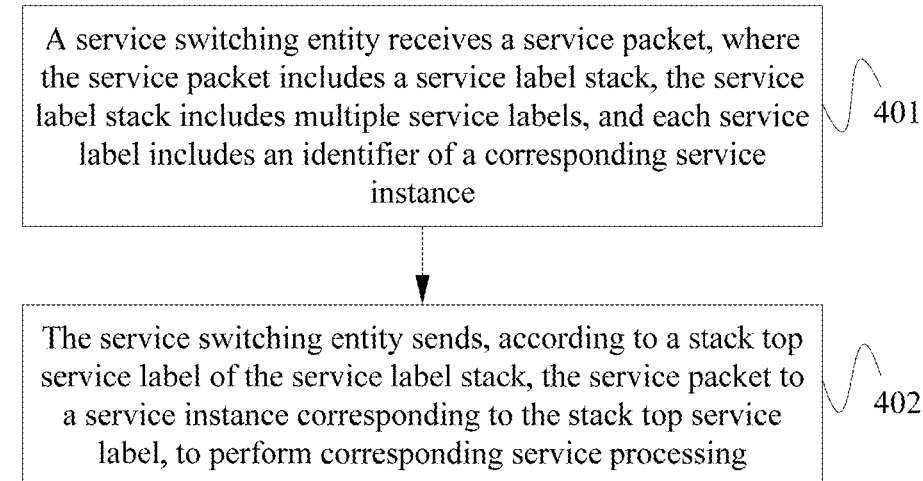
FIG. 4 is a flowchart of Embodiment 4 of a packet sending method according to the application.

FIG. 4 is a flowchart of Embodiment 4 of a packet sending method according to the application. In Embodiment 3, a service switching entity implements packet forwarding among service instances in a manner of querying a routing table entry; in the method provided in this embodiment, a service switching entity implements packet forwarding by means of a label stack. After receiving a service packet, the service switching entity does not need to query a routing table entry, but performs forwarding according to a service label carried in the service packet. Each service label includes an identifier of a service instance, and therefore, the service switching entity forwards the packet to a corresponding service instance according to the service label. The following provides detailed description. As shown in FIG. 4, the method provided in this embodiment includes the following:

401: A service switching entity receives a service packet, where the service packet includes a service label stack, the service label stack includes multiple service labels, and each service label includes an identifier of a corresponding service instance.

That a service switching entity receives a service packet includes that: the service switching entity receives the service packet sent by a router; or the service switching entity receives the service packet sent by a service switching entity corresponding to a previous-hop service instance. In this embodiment, the service switching entity is a service server, and a network architecture applicable to this embodiment includes the service server, a service controller, and a router. When the service server is used as a first-hop service server, the service server receives a service packet forwarded by the router; when the service server is not the first-hop service server, the service server receives a service packet sent by a previous-hop service instance or a service server corresponding to the previous-hop service instance.

402: The service switching entity sends, according to a stack top service label of the service label stack, the service packet to a service instance corresponding to the stack top service label, to perform corresponding service processing.

After receiving the packet, the service switching entity acquires, according to the stack top service label of the service label stack, an identifier that is of a next-hop service instance and included in the stack top service label; the service switching entity sends, according to the identifier of the next-hop service instance, the packet to the corresponding service instance, to perform corresponding service processing; after processing the service packet, the service instance pops the stack top service label, and sends a processed packet to the service switching entity. In this embodiment, the service switching entity is a service server; after processing the packet, the service instance pops the stack top service label, and a service server corresponding to the service instance forwards, according to a new stack top service label, a processed packet to a next-hop service instance, to perform next-hop processing.

In this embodiment, the service packet further includes a user identifier, a flow group identifier, an identifier of a source service instance, and a processing result of the source service instance, so that the next-hop service instance processes the service packet according to the user identifier and the flow group identifier.

According to the method provided in this embodiment, a service switching entity forwards a packet according to a stack top service label carried in the packet, where the stack top service label includes an identifier of a next-hop service instance; and the service switching entity forwards, according to the stack top service label, the packet to the next-hop service instance, to perform processing. In this embodiment, routing is implemented by means of a label stack, so that the service switching entity can complete packet forwarding only according to a service label stack carried in the packet, which facilitates to flexibly implement packet forwarding among service instances.

Figures 5, 6:
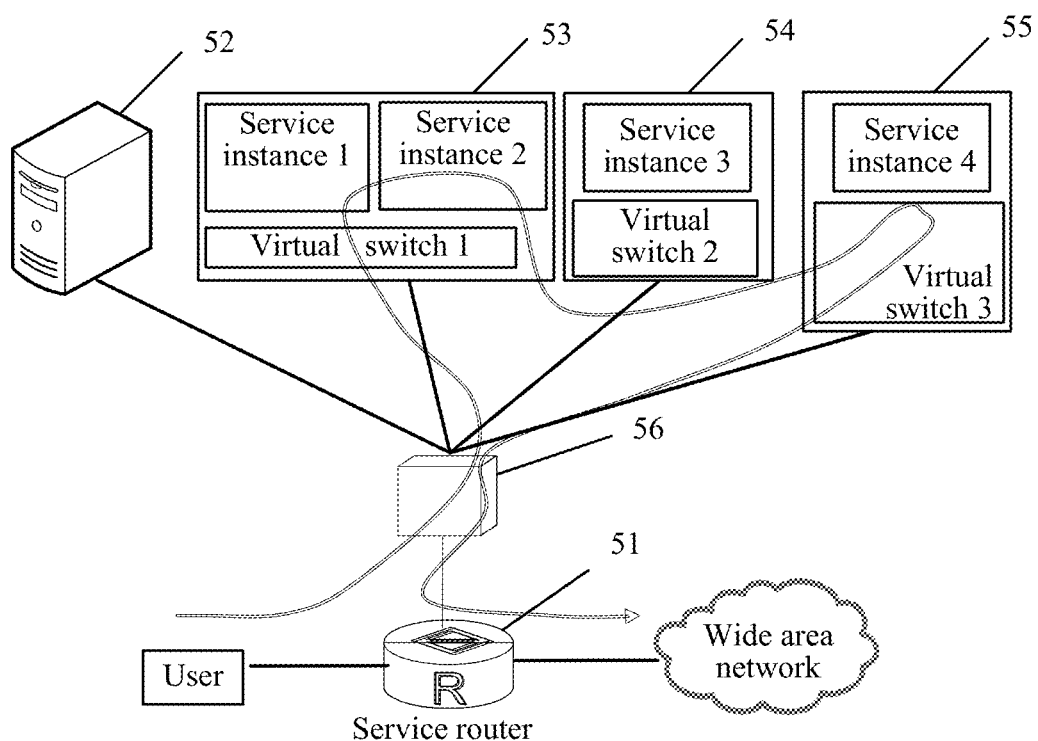
FIG. 5 is a schematic diagram of a network architecture that is applicable to Embodiment 5 of the application.
FIG. 6 is an encapsulation format of a packet transferred between physical servers.

FIG. 5 is a schematic diagram of a network architecture that is applicable to Embodiment 5 of the application. The network architecture shown in FIG. 5 is used as an example for description in Embodiment 5 of the application. As shown in FIG. 5, the network architecture includes a router 51, a service controller 52, a service server 53, a service server 54, a service server 55, and a service switching entity 56. The router 51 is connected to a user side, a wide area network, and the service switching entity 56; the service switching entity 56 is connected to the service servers 53, 54, and 55, and the service controller 52 separately; the router 51 sends a packet to each service server and the service controller 52 by using the service switching entity 56. Multiple service instances and one virtual switch may be deployed on each service server. In the figure, a service instance 1, a service instance 2, and a virtual switch 1 are deployed on the service server 53; a service instance 3 and a virtual switch 2 are deployed on the service server 54; a service instance 4 and a virtual switch 3 are deployed on the service server 55.

A flow table entry is saved on the router 51; the flow table entry is delivered by the service controller 52; the flow table entry includes multiple entries, and each entry includes a user identifier, IP 5-tuple information, a flow group identifier, and information about a next-hop service switching entity. The router 51 determines a flow by using the user identifier and the IP 5-tuple information, and forwards a service packet according to a determined flow group identifier and determined information about a next-hop service server, so as to forward the packet to a specified service server. If the router 51 does not find, in the flow table entry, a matched flow group identifier, that is, the flow is an unidentified flow, and for an unidentified flow, the router 51 sends the flow to the service controller 52 by using the service switching entity 56.

The service controller 52 receives the unidentified flow sent by the router 51, and determines, according to the user identifier, the IP 5-tuple information, and a setting policy of a user, a flow group identifier and information about a next-hop service server that are matched with the user identifier and the IP 5-tuple information; the service controller 52 determines a flow table entry of the flow and a routing table entry according to the user identifier and the IP 5-tuple information; the service controller 52 formulates one set of service routing table entries for each flow group, and delivers the flow table entry to the router 51, and delivers the routing table entry to the service servers 51, 52, and 53. Specifically, in this embodiment, the service controller 52 delivers the routing table entry to the virtual switch deployed on each service server, and each virtual switch receives and saves the routing table entry.

The routing table entry is saved on the virtual switch; after the service server receives a packet from the router 51 or a previous-hop service server, the virtual switch searches the routing table entry according to a user identifier, a flow group identifier, an identifier of a source service instance and a processing result of the source service instance that are in the packet to obtain an identifier of a corresponding destination service instance, and then, forwards the packet to the corresponding service instance. When the virtual switch receives a packet on which a local service instance completes service processing, the local service instance refers to a service instance that is deployed on a same service server together with the virtual switch.

In this embodiment, assuming that a corresponding flow group identifier and information about a next-hop service server can be matched in the flow table entry after the router 51 receives a service packet sent by the user, it is unnecessary to send the flow to the service controller 52 to perform decision making. As shown in FIG. 5, a hollow line in the figure represents a service packet transferring path. Starting from the user side, the packet successively passes through the router 51, the service instance 1, the service instance 2, the service instance 4, and the router 51; then, the router 51 forwards the packet to the wide area network.

The following provides detailed description. Firstly, the router 51 receives the service packet sent by the user side and acquires a user identifier and IP 5-tuple information that are corresponding to the packet; then, the router 51 searches the flow table entry according to the user identifier and the IP 5-tuple information to acquire the flow group identifier, and determines, according to the flow group identifier, information about a next-hop service instance, that is, information about the service instance 1, where the information about the service instance may be an identifier of the service instance; then, the router 51 searches an address resolution table according to the identifier of the service instance 1, where the address resolution table is maintained by the service controller 52, and the address resolution table includes the identifier of the service instance and a corresponding MAC address of the service instance; the service controller 52 sends the address resolution table to the router 51 and each service server. The router 51 finds by means of querying, in the address resolution table according to the identifier of the service instance 1, a MAC address corresponding to the service instance 1, where the MAC address is a MAC address of the service server 53 to which the service instance belongs; then, the router 51 encapsulates the packet, and forwards an encapsulated packet to the service instance 1, where encapsulated content includes the user identifier, the flow group identifier, a router identifier, a processing result of the router, an identifier of a destination service instance, a MAC address of the destination service instance, and the like.

Specifically, the router sends the packet to the virtual switch 1; the virtual switch 1 forwards the packet to the service instance 1 according to the identifier of the destination service instance 1; after completing service processing on the packet, the service instance 1 encapsulates the packet and forwards an encapsulated packet to the virtual switch 1, where encapsulated content includes the user identifier, the flow group identifier, and the identifier of the source service instance, the processing result of the source service instance. Herein, the identifier of the source service instance refers to the identifier of the service instance 1 of the service server 53, and the processing result is a processing result of the service instance 1 of the service server 53. As shown in FIG. 6, FIG. 6 is an encapsulation format of a packet transferred among physical servers. The encapsulation format includes the user identifier, the flow group identifier, the identifier of the source service instance, and the processing result, and may further include a TTL, where the TTL is a set time value and is used to prevent an endless loop caused by a service orchestration error; when the set TTL time expires, the packet is discarded. After receiving the packet sent by the local service instance 1, the virtual switch 1 queries the routing table entry according to the user identifier, the flow group identifier, the identifier of the source service instance, and the processing result to obtain an identifier of a next-hop service instance, that is, an identifier of the service instance 2; and queries the address resolution table according to the identifier of the service instance 2 to obtain an address of the service server 53 to which the service instance 2 belongs. In this embodiment, because both the service instance 1 and the service instance 2 belong to the service server 53, their MAC addresses are the same. Therefore, the virtual switch 1 forwards the packet to the service instance 2 according to the identifier of the destination service instance 2. After processing the packet, the service instance 2 encapsulates the packet, where except that an identifier, of a source service instance, encapsulated herein is the identifier of the service instance 2 and the processing result is a processing result of the service instance 2, encapsulated content is the same as that of the service instance 1; then, the service instance 2 sends an encapsulated packet to the virtual switch 1.

After receiving the packet sent by the service instance 2, the virtual switch 1 also queries the routing table entry to obtain an identifier of the destination service instance 4; acquires, by means of querying according to the identifier of the service instance 4, a MAC address of the service server 55 to which the service instance 4 belongs; and sends the packet to the service server 55. After receiving the packet, the virtual switch 3 of the service server 55 sends the packet to the service instance 4 according to the identifier that is of the destination service instance and carried in the packet. After processing the packet, the service instance 4 encapsulates the packet, and for encapsulated content, reference may be made to the foregoing description. After completing the encapsulation of the packet, the service instance 4 sends an encapsulated packet to the virtual switch 3. The virtual switch learns that an identifier of a next-hop service instance is an identifier of the router 51 by querying the routing table entry according to the user identifier, the flow group identifier, the identifier of the source service instance, and the processing result, and then, the virtual switch 3 re-encapsulates the packet and sends a re-encapsulated packet to the router 51. After receiving the packet, the router 51 forwards the packet to a network according to the user identifier and a destination IP address.

According to the network architecture provided in this embodiment, after a router identifies a type of a flow according to a flow table entry, a virtual switch on each service server performs routing in a table lookup manner according to the type of the flow. Because each service instance has a globally unique identifier, by querying an identifier of a service instance in a routing table entry, a packet is forwarded to the service instance, to perform processing, thereby implementing packet forwarding among service instances.

Figure 7:
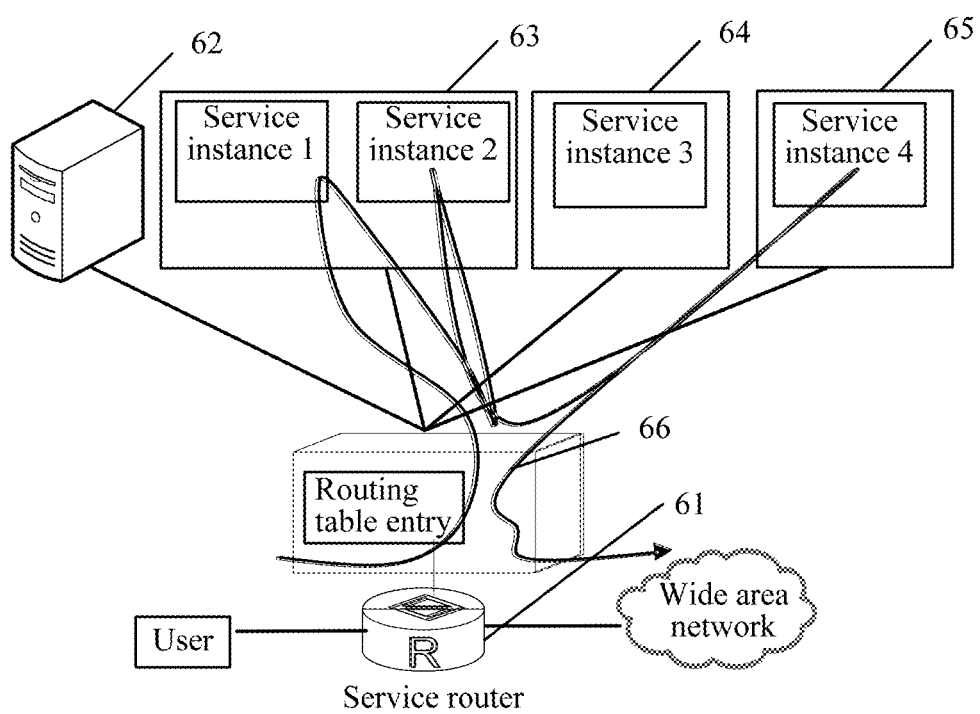
FIG. 7 is a schematic diagram of a network architecture that is applicable to Embodiment 6 of the application.

FIG. 7 is a schematic diagram of a network architecture that is applicable to Embodiment 6 of the application. A difference from Embodiment 5 is that in this embodiment, a service switch of a service platform center is used to complete a service routing function. After completing service processing, a service instance sends a packet to the service switch, and the service switch centrally forwards the service packet. A routing table entry is saved on the service switch; when a user gets online, a service controller delivers the routing table entry to the switch, which is different from Embodiment 5 in which a service controller delivers a routing table entry to each virtual switch.

The network architecture shown in FIG. 7 is used as an example for description in this embodiment. As shown in FIG. 7, the network architecture includes a router 61, a service controller 62, three service servers, and a service switch 66, where the three service servers are a service server 63, a service server 64, and a service server 65, respectively. The router 61 is connected to a user side and a wide area network, and is also connected to the service controller 62 and the service switch 66; the service switch 66 is connected to the service servers 63, 64, and 65 separately; multiple service instances may be deployed on each service server. In the figure, a service instance 1 and a service instance 2 are deployed on the service server 63; a service instance 3 is deployed on the service server 64; a service instance 4 is deployed on the service server 65.

A flow table entry is saved on the router 61; the flow table entry is delivered by the service controller 62; the flow table entry includes multiple entries, and each entry includes a user identifier, IP 5-tuple information, a flow group identifier corresponding to a service packet, and information about a next-hop service switching entity. The router 61 determines a flow according to the user identifier and the IP 5-tuple information, and encapsulates a packet after identifying the flow, where encapsulated content includes the user identifier, the flow group identifier, an identifier of a source service instance, and a processing result. The router 61 may be used as a service instance, and the router 61 herein has a globally unique identifier. Generally, a router only forwards a packet without performing processing; therefore, a processing result of the router 61 is 0. After encapsulating the packet, the router 61 sends an encapsulated packet to the service switch 66. If the router 61 does not find, in the flow table entry, a matched flow group identifier, that is, an unidentified flow, and for an unidentified flow, the router 61 sends the flow to the service controller 62.

The service controller 62 receives the unidentified flow sent by the router 61; determines, according to the user identifier, the IP 5-tuple information, and a setting policy of a user, a flow group identifier that is matched with the user identifier and the IP 5-tuple information; and determines a flow table entry of the flow and service routing table entry. The service controller 62 formulates one set of service routing for each flow group, delivers the flow table entry to the router 61, and delivers the routing table entry to the service switch 66.

The routing table entry is saved on the service switch 66; the routing table entry includes multiple entries, and each entry includes a user identifier, a flow group identifier, an identifier of a source service instance, a processing result of the source service instance, and an identifier of a destination service instance. The service switch 66 receives a service packet that is from the router 61 or sent by a previous-hop service instance; after searching the routing table entry according to a user identifier, a flow group identifier, an identifier of a source service instance, and a processing result that are in the packet to obtain an identifier of a corresponding destination service instance, the service switch 66 forwards the packet to the corresponding service instance. Specifically, the switch searches an address resolution table according to the identifier of the destination service instance to obtain an address of a next-hop service instance; and sends an encapsulated packet to the destination service instance after encapsulating the packet, where encapsulated content includes the user identifier, the flow group identifier, the identifier of the source service instance, the processing result, and an address of the destination service instance.

After receiving the packet, the service instance processes the packet according to the user identifier and the flow group identifier, and then encapsulates the packet, where encapsulated content is the user identifier, the flow group identifier, the identifier of the source service instance, and the processing result. Herein, the identifier of the source service instance is an identifier of the service instance, and the processing result is a returned value of a processing result of the service instance. After encapsulating the packet, the service instance forwards an encapsulated packet to the service switch 66. The service switch 66 queries the routing table entry and forwards the packet. When an identifier that is of a destination service instance and obtained by the service switch 66 by means of querying is an identifier of the router 61, the service switch 66 sends an encapsulated packet to the router 61 after encapsulating the packet; the router 61 searches a corresponding routing table according to the user identifier and a destination IP address, and forwards the packet to the wide area network.

In this embodiment, assuming that a corresponding flow group identifier can be matched in the flow table entry after the router 61 receives a service packet sent by the user, it is unnecessary to send the flow to the service controller 62 to perform decision making. As shown in FIG. 7, a hollow line in the figure represents a service packet forwarding path. Firstly, the router 61 receives the service packet sent by the user side, and acquires a user identifier and IP 5-tuple information that are corresponding to the packet; then, the router 61 searches the flow table entry according to the user identifier and the IP 5-tuple information to acquire a flow group identifier, and encapsulates the packet and sends an encapsulated packet to the service switch 66. The service switch 66 queries the routing table entry according to the user identifier, the flow group identifier, the identifier of the router 61, and the processing result to obtain an identifier of a next-hop service instance, that is, an identifier of the service instance 1; and forwards the packet to the service instance 1. After processing the packet, the service instance 1 re-encapsulates the packet and sends a re-encapsulated packet to the service switch 66. The service switch 66 queries the service routing table entry, and forwards the packet to the service instance 2 to perform processing. After processing the packet, the service instance 2 forwards a processed packet to the service switch 66. The service switch 66 queries the routing table entry and forwards the packet to the service instance 4. After processing the packet, the service instance 4 sends a processed packet to the service switch 66. The service switch forwards the packet to the router 61 according to the routing table entry. The router 61 forwards the packet to the wide area network according to the user identifier and a destination IP address.

In this embodiment, after a router determines a type of a flow, a service switch 66 centrally forwards a packet; the service switch queries a saved routing table entry, and forwards, according to an identifier of a destination service instance, the packet to the destination service instance to perform processing; after processing the packet, each service instance sends a processed packet to the service switch, and the service switch forwards the processed packet to a next-hop service instance, thereby implementing packet forwarding among service instances.

Figure 8:
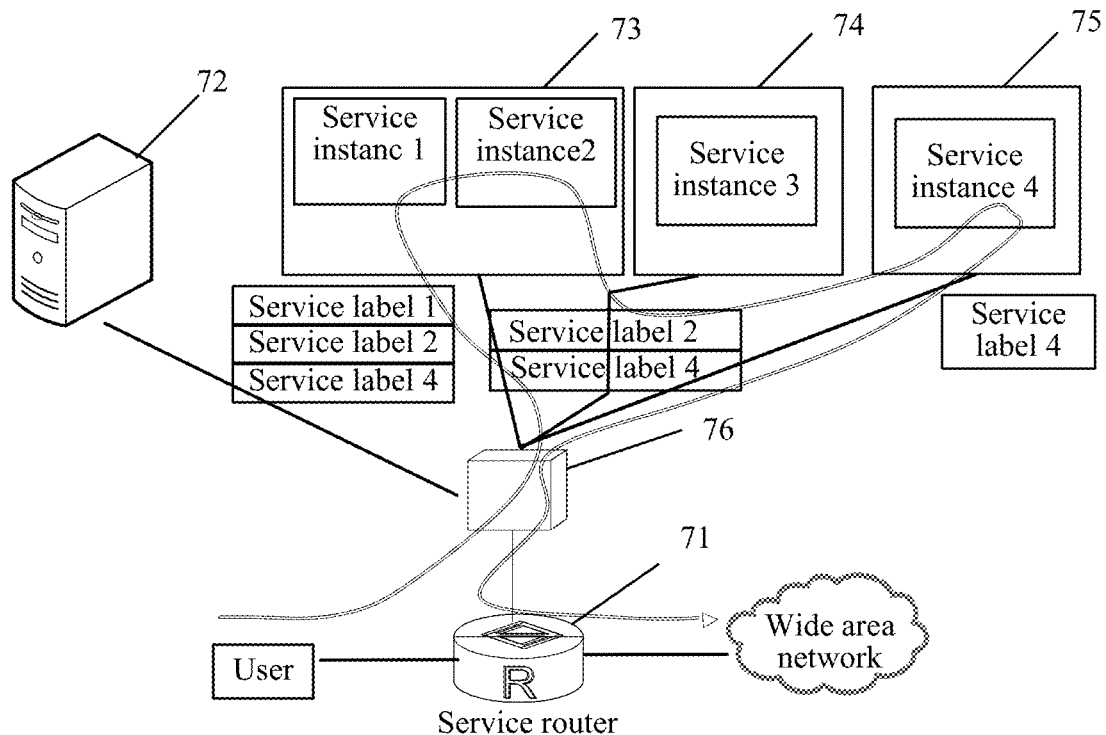
FIG. 8 is a schematic diagram of a network architecture that is applicable to Embodiment 7 of the application.

FIG. 8 is a schematic diagram of a network architecture that is applicable to Embodiment 7 of the application. The network architecture shown in FIG. 8 is used as an example for description in this embodiment, and includes a router, a service controller, multiple service servers, and a service switch. In this embodiment, routing and forwarding are performed on a packet by means of a label; therefore, functions of the router, the service controller, and the service servers are different from those in Embodiment 5 and Embodiment 6. As shown in FIG. 8, a router 71 is connected to a user side, a wide area network, and a service switch 76; the service switch 76 is connected to a service controller 72 and service servers 73, 74, and 75 separately; the router 71 sends a packet to the service controller 72 and the service servers 73, 74, and 75 by using the service switch 76. Multiple service instances may be deployed on each service server. In the figure, a service instance 1 and a service instance 2 are deployed on the service server 73; a service instance 3 is deployed on the service server 74; a service instance 4 is deployed on the service server 75.

In this embodiment, the router 71 performs flow matching on a received service packet. The flow matching is also performed according to a user identifier and IP 5-tuple information that are acquired, so as to acquire a flow group identifier of the flow and a service label stack. The service label stack is encapsulated in the packet.

The service label stack includes multiple service labels, and each service label includes an identifier of a corresponding service instance. Then, the router 71 forwards the service packet to a first service instance according to a stack top service label. If the router 71 cannot identify the flow, the router 71 sends the flow to the service controller 72.

The service controller 72 specifies a service path for each type of service flow of a user, and specifies the service path of the service flow by means of a service label stack. When the user gets online, all service label tables of the user are delivered to the router 71 and each service server.

After receiving a service packet, a service server sends the packet to a corresponding service instance according to an identifier that is of the service instance and included in a stack top service label. After the service instance completes service processing, the service server performs an operation of popping a service label or an operation of pushing a service label. In a normal case, after the service instance processes the packet, the service server performs the operation of popping a service label, and sends the packet to a next-hop service instance according to a new stack top service label. When determining, according to a result of the service instance, that an error occurs in the packet, or in another case, the service server pops all service labels, re-pushes a new service label, and then, performs packet forwarding according to the service label stack.

In this embodiment, assuming that a corresponding flow group identifier can be matched in a flow table entry after the router 71 receives a service packet sent by the user side, it is unnecessary to send the flow to the service controller 72 to perform decision making. As shown in FIG. 8, a hollow line in the figure represents a service packet transferring path. It can be seen from the figure that after being initiated from the user side, the packet successively passes through the router 71, the service instance 1, the service instance 2, and the service instance 4, and then, returns to the router 71; the router 71 forwards the packet to the wide area network.

Firstly, the router 71 receives the service packet sent by the user side and acquires a user identifier and IP 5-tuple information that are corresponding to the packet; then, the router 71 searches the flow table entry according to the user identifier and the IP 5-tuple information to acquire a flow group identifier, and determines a service label stack corresponding to the flow; pushes a service label corresponding to the service label stack into the service label stack, and adds, into the service packet, a service label stack into which the service label is pushed. As shown in the figure, the service label stack includes three service labels, which are a service label 1, a service label 2, and a service label 4 in order from the top to the bottom of the stack. The service label 1 includes an identifier of the service instance 1; the service label 2 includes an identifier of the service instance 2; the service label 4 includes an identifier of the service instance 4. According to a stack top service label of the service label stack, that is, the service label 1, the router 71 sends a processed service packet to a next-hop service instance, that is, the service instance 1. Specifically, the router 71 searches an address resolution table according to the stack top service label; acquires, according to the identifier of the next-hop service instance 1, a MAC address of the service server 73 to which the service instance 1 belongs; and sends the packet to the service server 73 according to the MAC address. The service server 73 forwards the packet to the service instance 1 according to the stack top service label.

After the service instance 1 processes the packet, the service server 73 determines, according to a processing result, whether to perform forwarding according to the original service label stack; if yes, pops the stack top service label, and forwards, according to a new stack top service label, the packet to a service instance corresponding to the new stack top service label, that is, forwards the packet to the service instance 2; if no, determines a destination service label stack according to the user identifier, the flow group identifier, an identifier of a source service instance, and a processing result of the source service instance, pushes a destination service label into the service label stack, and forwards the packet according to the destination service label stack. Herein, the source service instance refers to the service instance 1; the identifier of the source service instance refers to the identifier of the service instance 1; the processing result of the source service instance refers to a processing result of the service instance 1. In this embodiment, the service server 73 pops the service label 1 according to the processing result of the service instance 1, and forwards the packet to the service instance 2 according to the service label 2. After the service instance 2 processes the packet, the service server 73 pops a stack top service label, that is, the service label 2, and forwards the packet to the service instance 4 according to a new stack top service label, that is, the service label 4. After the service instance 4 processes the packet, the service server 75 pops the stack top service label, that is, the service label 4, and forwards the packet to the router 71. The router 71 forwards the packet to the wide area network according to the user identifier and a destination IP address.

According to the network architecture provided in this embodiment, a router determines a type of a flow, and determines a service label stack of the flow according to the type of the flow. The router adds a label stack into a packet, and forwards the packet to a service instance according to a stack top service label. The stack top service label includes an identifier of a next-hop service instance; after each service instance processes the packet, the stack top service label is popped, so that a service server to which the service instance belongs forwards the packet according to a new stack top service label, thereby implementing packet forwarding among service instances by means of a label stack.

Figure 9:
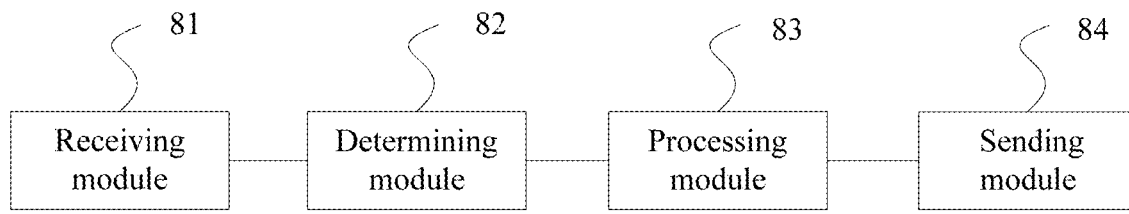
FIG. 9 is a schematic structural diagram of a router according to Embodiment 8 of the application.

FIG. 9 is a schematic structural diagram of a router according to Embodiment 8 of the application. As shown in FIG. 9, the router provided in this embodiment includes a receiving module 81, a determining module 82, a processing module 83, and a sending module 84.

The receiving module 81 is configured to receive a service packet sent by a user, and acquire a user identifier and IP 5-tuple information according to the service packet.

The determining module 82 is configured to determine, in a flow table entry, a flow group identifier and information about a next-hop service switching entity that are matched with the user identifier and the IP 5-tuple information, where the flow table entry includes multiple entries, and each entry includes a user identifier, IP 5-tuple information, a flow group identifier, and information about a next-hop service switching entity.

The processing module 83 is configured to process the service packet, where a processed service packet includes the user identifier, the flow group identifier, a router identifier, and a processing result.

The sending module 84 is configured to send the processed service packet to the next-hop service switching entity according to the information about the next-hop service switching entity, so that the next-hop service switching entity forwards the processed service packet to a corresponding destination service instance.

In this embodiment, the receiving module 81 is further configured to, before the determining module 82 determines, in the flow table entry, the flow group identifier and the information about the next-hop service switching entity that are matched with the user identifier and the IP 5-tuple information, receive the flow table entry sent by a service controller.

The sending module 84 is further configured to, if the flow group identifier and the information about the next-hop service switching entity that are matched with the user identifier and the IP 5-tuple information do not exist in the flow table entry, send the packet to the service controller, so that the service controller determines, according to a setting policy of the user, the flow group identifier and the information about the next-hop service switching entity that are matched with the user identifier and the IP 5-tuple information; and after the service controller determines the flow group identifier and the information about the next-hop service switching entity, generate a corresponding destination flow table entry, and send the destination flow table entry to the next-hop service switching entity. Therefore, the receiving module 81 is further configured to receive the destination entry sent by the service controller, where the destination entry includes the user identifier, the IP 5-tuple information, the flow group identifier, and the information about the next-hop service switching entity. In an implementation manner of the application, the router further includes an updating module, configured to update the flow table entry according to the destination entry after the receiving module 81 receives the destination entry sent by the service controller.

In this embodiment, the information that is about the next-hop service switching entity and included in each entry of the flow table entry is an identifier of the next-hop service switching entity, or a service label stack. If the information about the next-hop service switching entity is the identifier of the next-hop service switching entity, the packet is forwarded to the next-hop service switching entity according to the identifier; if the information about the next-hop service switching entity is a service label stack, and a stack top service label of the service label stack is an identifier of a next-hop service instance, the processing module 83 is specifically configured to push, according to the service label stack matched with the user identifier and the IP 5-tuple information, a service label corresponding to the service label stack into the service label stack, and adds, into the service packet, a service label stack into which the service label is pushed; the sending module 84 is specifically configured to send the processed service packet to the next-hop service instance according to the stack top service label of the service label stack.

The router provided in this embodiment may be configured to implement the technical solutions provided in the foregoing method Embodiments 1, 2, 5, and 6. Specific implementation manners and technical effects are similar in the five embodiments, and therefore, details are not described again.

Figure 10:
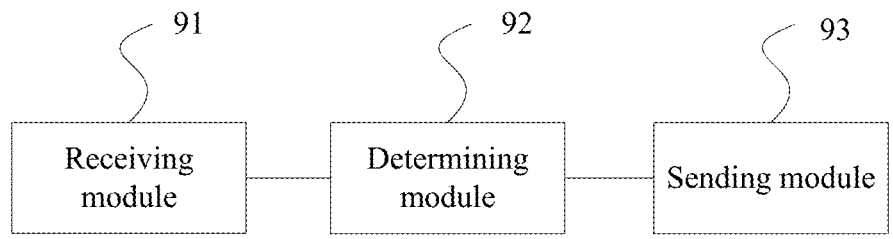
FIG. 10 is a schematic structural diagram of a service switching entity according to Embodiment 9 of the application.

FIG. 10 is a schematic structural diagram of a service switching entity according to Embodiment 9 of the application. As shown in the figure, the service switching entity provided in this embodiment includes a receiving module 91, a determining module 92, and a sending module 93.

The receiving module 91 is configured to receive a service packet, where the service packet includes a user identifier, a flow group identifier, an identifier of a source service instance, and a processing result of the source service instance.

The determining module 92 is configured to determine, in a routing table entry, an identifier that is of a destination service instance and corresponding to the user identifier, the flow group identifier, the identifier of the source service instance, and the processing result, where the routing table entry includes multiple entries, and each entry includes a user identifier, a flow group identifier, an identifier of a source service instance, a processing result of the source service instance, and an identifier of a destination service instance.

The sending module 93 is configured to send, according to the identifier of the destination service instance, the service packet to the destination service instance corresponding to the identifier of the destination service instance, to perform corresponding service processing.

The receiving module 91 is specifically configured to receive the service packet sent by a router, or receive the service packet sent by a previous-hop service instance, or receive the service packet sent by a service server corresponding to the previous-hop service instance. If the service packet received by the receiving module 91 is sent by the router, the identifier of the source service instance is a router identifier, and the processing result is a result obtained after the router processes the packet. The determining module 92 is specifically configured to determine, in the routing table entry, the identifier that is of the destination service instance and corresponding to the user identifier, the flow group identifier, the router identifier, and the processing result.

In this embodiment, if the identifier that is of the destination service instance and determined by the determining module 92 is the router identifier, the sending module 93 is specifically configured to send the service packet to the router according to the router identifier, so that the router forwards the packet according to the user identifier and a destination IP address.

The service switching entity provided in this embodiment may be configured to implement the solutions provided in the method Embodiments 3, 5, and 6. Specific implementation manners and technical effects are similar in the five embodiments, and therefore, details are not described again.

Figure 11:
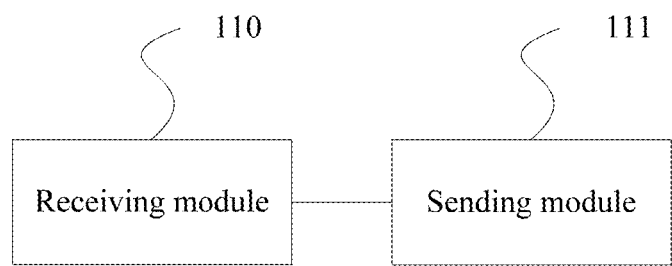
FIG. 11 is a schematic structural diagram of a service switching entity according to Embodiment 10 of the application.

FIG. 11 is a schematic structural diagram of a service switching entity according to Embodiment 10 of the application. As shown in the figure, the service switching entity provided in this embodiment includes a receiving module 110 and a sending module 111.

The receiving module 110 is configured to receive a service packet, where the service packet includes a service label stack, the service label stack includes multiple service labels, and each service label includes an identifier of a corresponding service instance.

The sending module 111 is configured to send, according to a stack top service label of the service label stack, the service packet to a service instance corresponding to the stack top service label, to perform corresponding service processing.

The receiving module 110 is specifically configured to receive a service packet sent by a router, or receive a service packet sent by a service switching entity corresponding to a previous-hop service instance.

In this embodiment, the service packet may further include a user identifier, a flow group identifier corresponding to the packet, an identifier of a source service instance, and a processing result obtained after a service instance corresponding to the source service instance processes the packet, so that a next-hop service instance processes the service packet according to the user identifier, the flow group identifier, the identifier of the source service instance, and the processing result.

In an implementation manner of the application, the service switching entity provided in this embodiment may further include a determining module, where the determining module is configured to determine, according to a processing result of a service instance, whether to perform forwarding according to a service label stack;

if yes, the sending module 111 is specifically configured to pop a stack top service label, and forward, according to a new stack top service label, the packet to a service instance corresponding to the new stack top service label; and if no, the sending module 111 determines a destination service label stack by querying a service label stack table according to the user identifier, the flow group identifier, the identifier of the source service instance, and the processing result of the source service instance; and forwards the packet according to the destination service label stack, where the source service instance refers to the service instance corresponding to the stack top service label, the service label stack table includes multiple entries, and each entry includes a user identifier, a flow group identifier, an identifier of a source service instance, a processing result of the source service instance, and a destination service label stack.

The service switching entity provided in this embodiment may be configured to implement the solutions in the method Embodiments 4 and 7. Specific implementation manners and technical effects are similar in the five embodiments, and therefore, details are not described again.

A person of ordinary skill in the art may understand that all or some of the steps of the method embodiments may be implemented by a program instructing relevant hardware. The program may be stored in a computer-readable storage medium. When the program runs, the steps included in the method embodiments are performed. The foregoing storage medium includes any medium that can store program code, such as a ROM, a RAM, a magnetic disk, or an optical disc.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

Finally, it should be noted that the foregoing embodiments are merely intended for describing the technical solutions of the application, but not for limiting the application. Although the application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the application.

What is claimed is:

1. A packet sending method implemented by a router, the packet sending method comprising:
   receiving a service packet;
   acquiring a user identifier and Internet Protocol (IP) 5-tuple information according to the service packet;
   receiving, from a service controller, a flow table entry comprising the user identifier, the IP 5-tuple information, a flow group identifier identifying a service path, and information about a next-hop service switching entity;
   determining, from the flow table entry that the flow group identifier and the information match the user identifier and the IP 5-tuple information;
   processing the service packet to obtain a processed service packet; and
   sending the processed service packet to the next-hop service switching entity according to the information, wherein the processed service packet comprises the flow group identifier and a router identifier.

2. The packet sending method of claim 1, wherein the processed service packet further comprises the user identifier or a processing result.

3. The packet sending method of claim 1, wherein when the flow group identifier and the information do not exist in the flow table entry, the packet sending method further comprises:
   sending the service packet to the service controller; and
   receiving, from the service controller, a destination entry comprising the user identifier, the IP 5-tuple information, the flow group identifier, and the information.

4. The packet sending method of claim 3, wherein after receiving the destination entry, the packet sending method further comprises updating the flow table entry according to the destination entry.

5. The packet sending method of claim 1, wherein the information is an identifier of the next-hop service switching entity.

6. The packet sending method of claim 1, wherein the information is a service label stack wherein the service label stack comprises a stack top label that is an identifier of a next-hop service instance, and wherein the packet sending method further comprises:
   pushing, according to the service label stack matched with the user identifier and the IP 5-tuple information, the service label stack into the service packet; and
   sending the processed service packet to the next-hop service instance.

7. A router, comprising:

a memory comprising instructions; and one or more processors coupled to the memory and configured to execute the instructions to:

receive a service packet;

acquire a user identifier and Internet Protocol (IP) 5-tuple information according to the service packet;

receive, from a service controller, a flow table entry comprising the user identifier, the IP 5-tuple information, a flow group identifier identifying a service path, and information about a next-hop service switching entity;

determine, from the flow table entry, that the flow group identifier and the information match the user identifier and the IP 5-tuple information;

process the service packet to obtain a processed service packet; and send the processed service packet to the next-hop service switching entity according to the information, wherein the processed service packet comprises the flow group identifier and a router identifier.

8. The router of claim 7, wherein the processed service packet further comprises the user identifier or a processing result.

9. The router of claim 7, wherein when the flow group identifier and the information do not exist in the flow table entry, the one or more processors further execute the instructions to:

send the service packet to the service controller; and receive, from the service controller, a destination entry comprising the user identifier, the IP 5-tuple information, the flow group identifier, and the information.

10. The router of claim 9, wherein after receiving the destination entry, the one or more processors further execute the instructions to update the flow table entry according to the destination entry.

11. The router of claim 7, wherein the information is an identifier of the next-hop service switching entity.

12. The router of claim 7, wherein the information service label stack, wherein the service label stack comprises a stack top label that is an identifier of a next-hop service instance, and wherein the one or more processors further execute the instructions to:

push, according to the service label stack, the service label stack into the service packet; and send the processed service packet to the next-hop service instance.

13. A computer program product comprising computer-executable instructions for storage on a non-transitory computer-readable medium that, when executed by a processor, cause a router to:

receive a service packet;

acquire a user identifier and Internet Protocol (IP) 5-tuple information according to the service packet;

receive, from a service controller, a flow table entry comprising the user identifier, the IP 5-tuple information, a flow group identifier identifying a service path, and information about a next-hop service switching entity;

determine, from the flow table entry, that the flow group identifier and the information match the user identifier and the IP 5-tuple information;

process the service packet to obtain a processed service packet; and send the processed service packet to the next-hop service switching entity, wherein the processed service packet comprises the flow group identifier and a router identifier.

14. The computer program product of claim 13, wherein the processed service packet further comprises the user identifier or a processing result.

15. The computer program product of claim 13, wherein when the flow group identifier and the information do not exist in the flow table entry, the instructions further cause the router to:

send the service packet to the service controller; and receive, from the service controller, a destination entry comprising the user identifier, the IP 5-tuple information, the flow group identifier, and the information.

16. The computer program product of claim 15, wherein after receiving the destination entry, the instruction further cause the router to update the flow table entry according to the destination entry.

17. The computer program product of to claim 13, wherein the information is an identifier of the next-hop service switching entity.

18. The computer program product of claim 13, wherein the information is a service label stack, and wherein the service label stack comprises a stack top label that is an identifier of a next-hop service instance.

19. The computer program product of claim 18, wherein the instructions further cause the router to push, according to the service label stack, the service label stack into the service packet.

20. The computer program product of claim 19, wherein the instructions further cause the router to send the processed service packet to the next-hop service instance.

* * * * *